United States Patent [19]

Buxton et al.

[11] Patent Number: 5,985,047
[45] Date of Patent: Nov. 16, 1999

[54] ANTICORROSION TREATMENT OF METAL COATED STEEL HAVING COATINGS OF ALUMINIUM, ZINC OR ALLOYS THEREOF

[75] Inventors: David Peter Buxton, Hastings; Peter John Riley, Oaks Flats, both of Australia

[73] Assignees: ICI Australia Operations Pty. Ltd.; BHP Steel (JLA) Pty. Ltd., both of Melbourne, Australia

[21] Appl. No.: 08/640,860

[22] PCT Filed: Nov. 11, 1994

[86] PCT No.: PCT/AU94/00695

§ 371 Date: Sep. 30, 1996

§ 102(e) Date: Sep. 30, 1996

[87] PCT Pub. No.: WO95/14117

PCT Pub. Date: May 26, 1995

[30] Foreign Application Priority Data

Nov. 16, 1993 [AU] Australia ............................. PM2446

[51] Int. Cl.⁶ .................................................. C23C 22/00
[52] U.S. Cl. .......................... 148/247; 148/251; 148/261; 148/262; 148/273; 148/275
[58] Field of Search ..................... 148/251, 261, 148/247, 262, 273, 275

[56] References Cited

U.S. PATENT DOCUMENTS

| | | | |
|---|---|---|---|
| 3,053,692 | 9/1962 | Pocock | 117/75 |
| 3,528,860 | 9/1970 | Kronstein | 148/6.15 |
| 3,586,543 | 6/1971 | Iijima | 148/251 |
| 4,264,378 | 4/1981 | Oppen et al. | 148/261 |
| 4,385,940 | 5/1983 | Kirihara | 148/261 |
| 4,504,618 | 3/1985 | Irvine et al. | 524/457 |
| 4,637,840 | 1/1987 | Fujii et al. | 148/6.2 |
| 5,037,478 | 8/1991 | Okai | 148/247 |
| 5,328,525 | 7/1994 | Masingo | 148/247 |
| 5,362,832 | 11/1994 | Cook | 526/333 |

FOREIGN PATENT DOCUMENTS

| | | |
|---|---|---|
| 77714/87 | 3/1988 | Australia . |
| 22855/92 | 11/1993 | Australia . |
| 52237/93 | 7/1994 | Australia . |
| 1198546 | 7/1970 | United Kingdom . |

OTHER PUBLICATIONS

International Publication No. WO91/13849 published Sep. 19, 1991.
International Publication No. WO94/12687 published Jun. 9, 1994.
International Publication No. WO93/09266 publshed May 13, 1993.
Japanese Patent Abstract No. 60–240773 (Nov. 29, 1985).

Primary Examiner—James Sells
Assistant Examiner—Robert R. Koehler
Attorney, Agent, or Firm—Nikaido, Marmelstein, Murray & Oram LLP

[57] ABSTRACT

The present invention relates to a surface treating dispersion for treating a surface of zinc or of an alloy of zinc and aluminum, the surface treating dispersion comprising an aqueous solution having a pH of below 3 and a complex formed from at least one species of metal oxo ion in conjunction with at least one species of hetero ion, the metal oxo ion being selected from the group consisting of molybdate, tungstate and vanadate, the hetero ion being selected from the group consisting of phosphorus (V), aluminum (III), silicon (IV), manganese (II), manganese (IV), zirconium (IV), titanium (IV), tin (IV), cerium (III) and nickel (II); and with a film forming acid tolerant resin compatible with the selected ions.

19 Claims, No Drawings

ANTICORROSION TREATMENT OF METAL COATED STEEL HAVING COATINGS OF ALUMINIUM, ZINC OR ALLOYS THEREOF

This invention relates to anti corrosion treatment of galvanised steel having galvanising coatings of aluminium, zinc or alloys thereof, particularly aluminium/zinc alloys.

Alloys of aluminium, for example 55% by weight of aluminium, the balance substantially zinc (55 Al/Zn) are widely used as protective surface coatings for steel in order to prevent rust and corrosion of the steel substrate. However when surfaces of such coated steels are held in close proximity (as occurs, for example, in coils or packs of sheets) and are exposed to moisture during storage and the moisture is retained for a period, then the protective coatings can themselves readily become susceptible to corrosion. Based on their appearance, the residues of such corrosion are referred to as white rust for principally zinc only coated steels and black rust for coated steels whose coatings have a significant amount of aluminium contained within them. These residues generally make such coated steel unsaleable despite the fact that the overall service life of the coated steel may remain the same. The ability to resist such corrosion is referred to as wet stack performance.

In order to prevent the formation of such rust the coated steel surfaces are usually treated, prior to dispatch to customers, with a chromium containing solution, that treatment being hereinafter referred to as chromium passivation. While this provides a reasonable level of protection against rust, chromium solutions are highly toxic and therefore disposal of chromium residues from such treatment is difficult and expensive.

It is known to use a non-chromium passivation system such as that which involves the use of phosphates and/or molybdates as is described in U.S. Pat. Nos. 4,385,940 and 4,264,378. However, such systems do not provide adequate wet stack performance.

It is also known to apply a resin coating on top of the chromium passivation and/or incorporate the chromium within the resin as described in U.S. Pat. Nos. 3,053,692, 3,053,693, 3,630,791 and 4,637,840. While the use of such resins can increase the wet stack performance of steel coated with aluminium, zinc or alloys thereof in comparison with the performance of chromium passivation on its own, the resins provide another advantage in that they can remove the necessity for applying lubricating oil to aluminium or aluminium alloy coated steel during shaping, for example roll forming. This is because aluminium and aluminium alloy coatings do not possess the self lubricating properties of zinc coated steels, as recognised in the latter U.S. Pat. No. 4,637,840. Such lubricants add an additional cost to forming operations and may cause their own problems in regard to health and safety.

It is an object of the present invention to ameliorate one or more of the above disadvantages of the prior art. It is an object of preferred embodiments of the invention to provide a coated steel which does not necessitate use of a lubricating oil during ordinary shaping, and which is not chrome passivated but which nevertheless has acceptable wet stack performance.

According to one aspect, the present invention relates to a method for treating a surface of zinc or of an alloy of zinc and aluminium, said method comprising the step of treating said surface with an aqueous solution having a pH of below 3 and comprising a complex formed from at least one species of metal oxo ion in conjunction with at least one species of hetero ion, the metal oxo ion being selected from the group consisting of molybdate, tungstate and vanadate; the hetero ion being selected from the group consisting of phosphorus (V), aluminium (III), silicon (IV), manganese (II), manganese (IV), zirconium (IV), titanium (IV), tin (IV), cerium (III) and nickel (II); and with a film forming acid tolerant resin compatible with the selected ions.

According to a second aspect, the present invention consists in a dispersion comprising:

at least one metal oxo ion species in conjunction with at least one hetero ion species, the metal oxo ion being selected from the group consisting of molybdate, tungstate and vanadate; the hetero ion being selected from the group consisting of phosphorus (V), aluminium (III), silicon (IV), manganese (II), manganese (IV), zirconium (IV), titanium (IV), tin (IV), cerium (III) and nickel (II) in an aqueous medium at below pH 3, said medium having dispersed therein a compatible film forming acid tolerant resin.

In preferred embodiments of the invention the resin is a non ionic surfactant stabilized suspension. In highly preferred embodiments the ratio of weight of metal of the complex to resin in the bath is less than 0.5 moles per kilogram of dry resin solids. Desirably the film forming resin comprises one or more acid tolerant crosslinking agents.

Molybdenum is preferred as the metal of the oxo ion while phosphorus is the preferred hetero ion.

The invention will now be more particularly described by way of example only.

Resins suitable for the invention should be selected so as to remain stable during storage and application at the pH involved which is preferably below pH 2 and so as to avoid destabilisation by the presence of metals in the solution. The acid stable resins may be selected from the groups of water soluble and water dispersible resins and for preference are combined with the aqueous solution.

Such resins typically consist of addition polymers prepared by the incorporation of unsaturated monomers such as methyl methacrylate, butyl acrylate, ethyl acrylate, styrene, and the like, and unsaturated functional monomers such as hydroxyethyl acrylate, acrylic acid, methacrylic acid, and the like into acrylate ester or copolymer emulsions.

Additionally, preferred resins comprise sterically stabilised latex particles formed using non-ionic surfactants and which tolerate the low pH involved, typically below pH 2, and remain stable. Suitable resins may be thermosetting or thermoplastic by nature, or may contain functional groups as known to the art for the purpose of crosslinking with other resin additives. However, should they be reactive in this manner, they are most suitable if not rapidly crosslinked by the presence of the metals in the solution.

Highly preferred resins are those dispersions of polymer particles described in International Patent Application No. PCT/AU90/00565 or U.S. Pat. No. 4,504,618. These dispersions utilize non ionic surfactant stabiliziers and have been found to be surprisingly tolerant to the addition of metal ions and to remain stable at an acidic pH below pH 3 and typically below pH 2.

Molybdates such as ammonium molybdate, sodium molybdate or molybdic acid are usually employed as the source of the metal oxo ion species, but other compounds containing a metal oxo ion may also be used. Typically the molybdate is present in a concentration of from 0.02 to 0.12 moles of molybdenum per kilogram of resin solids and more preferably from 0.03 to 0.06 moles of molybdenum per kilogram of resin solids.

If the concentration of metal is excessive, the integrity of the resin film deteriorates with consequent reduction in corrosion protection. If the concentration is too low the treatment is ineffective.

The hetero ion species used in the present invention may be added to the metal oxo ion solution as an acid or salt. Preferably, phosphoric acid is used as the source of phosphorus, aluminium chloride is used as the source of aluminium and sodium silicate is the preferred source of silicon whereas zirconium tetrachloride is the preferred source of zirconium.

Desirably, aluminium etching agents are added to the solution for example, sodium fluoride or sodium tetrafluoroborate, but other aluminium etching agents may also be employed. Typically from 0 to 0.012 moles of fluoride per kilogram of resin solids is used in the present invention and more preferably from 0.004 to 0.008 moles of fluoride per kilogram of resin solid. Desirably, the resin is selected to be compatible with the fluoride so that the fluoride can be added to the latex and applied from a single bath.

It has been found that the anti corrosive property of treatments according to the present invention becomes deficient at pH above 5 and as such the pH of the acidified resin dispersion according to the present invention is preferably between pH 1 and pH 3 and more preferably below pH 2. The dispersion according to the present invention is desirably acidified by the addition of an acid which may be either an organic acid or an inorganic acid, for example phosphoric acid.

The bath during application is generally at ambient temperature.

When molybdates or tungstates in solution are acidified in the presence of a hetero ion according to the present invention, heteropoly acid complexes are formed. Depending on the hetero ion used, the ratio of hetero ion to molybdenum or tungsten varies. For example, when phosphorus is the hereto ion the ratio of phosphorus to molybdenum is typically from 1:12 to 1:6. When aluminium is the hetero ion, the ratio of aluminium to molybdenum or tungsten is from 1:5 to 1:7 and typically 1:6 whereas when the hetero ion is silicon, the ratio is from 1:10 to 1:14 and typically 1:12.

In preferred bath compositions according to the invention, molybdenum is employed as part of the oxo ion and is present in the bath at a weight ratio of from 0.005 to 0.5 moles of molybdenum per kilogram of resin solids (i.e. 0.05% to 5% based on the weight of dry resin) and preferably from 0.05 to 0:06 and more preferably from 0.01 to 0.02 moles of molybdenum per kilogram of resin solids.

The acid tolerant latex is typically supplied at around 50% solids but is usually from 25–35% solids in the application bath.

In preferred embodiments of the invention, an acid tolerant crosslinking agent is incorporated in the resin dispersion. This may for example be an imidazolidone resin or a phosphatized epoxy resin or the like, or a combination thereof. Such crosslinking agents should be selected to be stable with the pH conditions employed and to be tolerant of the metal ions present in solution. If a crosslinking resin is incorporated in the resin composition up to 15% by weight of crosslinking resin solids by weight of total resin solids may be used. If for example a glycouril formaldehyde resin of the imidazolidone family is used as a crosslinking resin then from 5–8% of the resin solids may be crosslinking resin if appropriate functional groups are chosen. If a phosphatized epoxy resin based crosslinking agent is employed, levels of from 2% to 10%, and preferably from 3% to 6% are employed (based on total resin solids).

The dispersion may be applied by dipping the substrate in a bath, by roller coater, or by any other suitable application means.

By way of further example, various acid tolerant resins for use in the invention were prepared as shown in Examples 1 to 5 below. Unless otherwise indicated, compositions are specified as parts by weight.

EXAMPLE 1

An acid tolerant resin having monomer composition methyl methacrylate 691 parts by weight, n-butyl acrylate 342 parts, hydroxy ethyl acrylate 57 parts, methacrylic acid 23 parts, glycerol propoxy triacrylate 23 parts, and 115 parts of a non ionic surfactant was prepared. The surfactant was prepared in a similar manner to Example 2 of International Patent Application No. PCT/AU90/00565 but comprising approximately one mole of unsaturated chain and 23 moles ethylene oxide.

The resin was prepared as an aqueous dispersion in a similar manner to that described in Example 5 of International Patent Application No. PCT/AU90/00565 and contained 44.4% non-volatile solids.

EXAMPLE 2

An acid tolerant resin latex was prepared as described in Example 13 of U.S. Pat. No. 4,504,618 having monomer composition methyl methacrylate 17.8 parts by weight, n-butyl acrylate 9.8 parts, acrylic acid 0.9 parts, and using a non ionic surfactant as described in Example 13 of U.S. Pat. No. 4,504,618 1.5 parts. The latex had 29.6% non-volatile solids.

EXAMPLE 3

An acid tolerant resin having monomer composition methyl methacrylate 276.28 parts by weight, butyl acrylate 136.90 parts, hydroxy ethyl acrylate 22.70 parts, methacrylic acid 9.08 parts, glycerol propoxy triacrylate 9.08 parts and 45.94 parts of a non ionic surfactant in accordance with example 3 of International Patent Application No. PCT/AU90/00565 was prepared. The surfactant comprised approximately one mole of unsaturated chain and 40 moles ethylene oxide.

The resin was prepared as an aqueous dispersion as in example 1 above and contained 49.2% non-volatile solids.

EXAMPLE 4

An acid tolerant resin aqueous dispersion having monomer composition methyl methacrylate 166.2 parts by weight, butyl acrylate 123.4 parts, styrene 81.6 parts, hydroxy ethyl acrylate 20.4 parts, methacrylic acid 8.16 parts, glycerol propoxy triacrylate 8.16 parts and 41.3 parts of the non ionic surfactant described in Example 1 above was prepared and contained 44.5% non-volatile solids.

EXAMPLE 5

An acid tolerant resin aqueous dispersion having monomer composition methyl methacrylate 288.25 parts by weight, butyl acrylate 148.03 parts, hydroxy ethyl acrylate 8.72 parts, acrylic acid 8.72 parts, glycerol propoxy triacrylate 8.72 parts, and 47.55 parts of a non ionic surfactant as described in Example 3 was prepared by the method of example 5 of PCT/AU90/00565. The resin dispersion contained 48.8% non-volatile solids.

EXAMPLE 6

A coating composition according to the invention was prepared by adding 0.543 g molybdenum (in the form of $(NH_4)_6 Mo_7O_{24} \cdot 4H_2O)$ and 0.014 g fluoride (in the form of NaF) to an acid tolerant resin aqueous dispersion according to Example 1 (100 g resin solids). The pH was then adjusted to pH 2 with phosphoric acid (85%).

EXAMPLE 7

Table 1 shows the results of coating 55 Al/Zn coated steel with aqueous compositions according to the invention and incorporating various of the acid tolerant resins prepared in Examples 1 to 5 above. As shown in Table 1 the treating compositions contained ammonium molybdate tetrahydrate and various amounts of Texanol (2,2,4,-trimethylethylpentane-1,3-diol monoisobutyrate, a coalescing solvent) available from Eastman Chemicals International Ltd, crosslinker resin Cymel 1175 available from Cytec Australia and phosphatized epoxy resin. The pH was adjusted to pH 1.5 using phosphoric acid (85%). The coating was applied to the substrate and heated for 25 seconds to achieve a metal coated steel peak temperature of 100° C. giving a film thickness of approximately 2–3 μm.

Wet storage stain (face, delamination and rust) was measured at 40° C. over 8 weeks and at 70° C. over 4 weeks with the results as shown in Table 1.

Wet storage ratings used in Table 1 are rated according to the following:

Wet Storage Ratings

| | | | |
|---|---|---|---|
| 10 | no change | 10 | none |
| 8 | slight change | 8 | opaque |
| 6 | pale mid grey | 6 | patches <30% |
| 4 | mid grey | 4 | 30–50% Face |
| 2 | dark grey | 2 | >50% face |
| 0 | black | 0 | all over face |

Delamination

| | |
|---|---|
| 10 | none |
| 9 | pin point-slight/scattered (<50% face) |
| 5 | slight 1–3 mm diameter (<20% face) |
| 7 | scattered 1–3 mm (<50% face) |
| 6 | slight >3 mm diameter (<20% face) |
| 5 | scattered >3 mm diameter (<50% face) |
| 4 | all over face, >3 mm diameter |
| 3 | <30% peeled off |
| 2 | 1/2 film peeled off |
| 0 | film peeled off |

Rust

| | |
|---|---|
| 10 | none |
| 9 | slight (<1 mm), scattered (not continuous) |
| 8 | 1–2 mm, ≦2 sides |
| 7 | 1–2 mm, up to 4 sides |
| 6 | 1–3 mm up to 4 sides |
| 5 | >3 mm up to 4 sides |
| 4 | creep around edges |
| 3 | rust on face <30% |
| 2 | rust on face <60% |
| 0 | all over face |

Blocking resistance of organic coatings were determined in accordance with Technical Bulletin No. II-17 issued by the National Coil Coaters Association dated May, 1980.

The resin was prepared as an aqueous dispersion as in example 1 above and substrates coated with the composition according to the present invention shows excellent anti corrosion properties and the long term prevention of black rust as well as good adhesion of paint. The coated surface is self lubricating during roll forming.

Although the invention has been described with reference to specific examples, it will be appreciated by those skilled in the art based on the teaching hereof that the invention may be embodied in many other forms.

TABLE 1

| RESIN | (A) CROSS-LINKER RESIN | (B) PHOSPHATIZED RESIN | (C) EPOXY | TEXANOL | (D) AMMONIUM MOLYBDATE TETAHYD-RATE | PH | WET STORAGE STAIN | | | | | | BLOCK-ING | BLUSH-ING |
|---|---|---|---|---|---|---|---|---|---|---|---|---|---|---|
| | | | | | | | FACE | | DELAMIN-ATION | | RUST | | | |
| | | | | | | | 40 | 70 | 40 | 70 | 40 | 70 | | |
| EXAMPLE 1 | 5.55 | — | 11.10 | 1.00 | 1.5 | 9 | 8 | 10 | 5 | 8 | 3 | 9 | 10 |
| EXAMPLE 1 | — | — | 11.37 | " | " | — | 8 | — | 5 | — | 3 | 9 | 0 |
| EXAMPLE 1 | — | — | 10.56 | — | " | 2 | — | 3 | — | 7 | — | 10 |
| EXAMPLE 2 | — | — | — | 1.00 | " | 8 | — | 10 | — | 3 | — | 9 | 10 |
| EXAMPLE 3 | 6.06 | — | 4.06 | 1.00 | " | 9 | 6 | 9 | 10 | 8 | 3 | — | 10 |
| EXAMPLE 3 | 6.03 | 5.35 | 4.39 | " | " | 9 | 9 | 10 | 10 | 7 | 8 | 9 | 10 |
| EXAMPLE 4 | — | — | 4.81 | — | " | 0 | — | 4 | — | 0 | — | — | 10 |
| EXAMPLE 4 | — | — | 4.81 | 1.00 | " | 8 | — | 10 | — | 3 | — | — | 6 |
| EXAMPLE 4 | 5.78 | — | 4.51 | " | " | 8 | 8 | 10 | 9 | 7 | 7 | 8 | 10 |
| EXAMPLE 4 | 6.30 | 3.25 | 4.68 | 1.00 | " | — | 9 | — | 10 | — | 7 | — | 10 |
| EXAMPLE 5 | 7.38 | — | 4.13 | 1.00 | " | 10 | 8 | 10 | 10 | 8 | 3 | 8 | 10 |
| EXAMPLE 5 | 7.56 | 5.11 | 4.96 | 1.00 | " | — | 8 | — | 10 | — | 5 | 8 | 9 |
| EXAMPLE 5 | — | 5.11 | 4.96 | — | — | — | 10 | — | 3 | — | 8 | — | 10 |

(A) g of crosslinker solids/100 g of latex resin solids. Cymel 1175 was used in these examples.
(B) g of phosphatized epoxy solids/100 g of latex resins solids.
(C) g of 100 g latex resin solids.
(D) 1 g of ammonium molybdate tetrahydrate [$(NH_4)_6Mo_7O_{24} \cdot 4H_2O$] (present in the molybdate/fluoride/acid solution) added to the mixture/100 g latex resin solids.

We claim:

1. A surface treating dispersion comprising at least one metal oxo ion species in conjunction with at least one hetero ion species, the metal oxo ion being selected from the group consisting of molybdate, tungstate and vanadate; the hetero ion being selected from the group consisting of phosphorus (V), aluminium (III), silicon (IV), manganese (II), manganese (IV), zirconium (IV), titanium (IV), tin (IV), cerium (III) and nickel (II) in an aqueous medium at below pH 3; said medium having dispersed therein a film forming acid tolerant resin compatible with the selected ions, wherein the resin is stabilized in suspension by a reactive non-ionic surfactant and further comprises an acid tolerant crosslinking agent.

2. A dispersion according to claim 1 wherein the resin comprises one or more acrylates.

3. A dispersion according to claim 1 wherein the resin comprises one or more acrylates selected from the group consisting of methyl methacrylate, N-butyl acrylate, hydroxy ethyl acrylate, and glycerol propoxy triacrylate.

4. A dispersion according to claim 1 wherein the resin is derived from polymerisation of at least one unsaturated monomer species in aqueous media in the presence of at least one unsaturated fatty alcohol alkoxylate having reactive unsaturation.

5. A dispersion according to claim 1 wherein the acid tolerant crosslinking agent is acid catalysed.

6. A dispersion according to claim 1 and applied as a film of less than three micrometers dry film thickness to a substrate.

7. A dispersion according to claim 6 wherein the dry film thickness is less than two micrometers.

8. A dispersion according to claim 1 wherein the metal oxo ion is molybdate.

9. A dispersion according to claim 1 wherein the hetero ion is phosphorus.

10. A dispersion according to claim 1 wherein the ratio of metal to resin in the solution is from 0.005 to 0.5 moles of metal present as a metal oxo ion per kg of resin solids.

11. A dispersion according to claim 10 wherein the ratio of metal to resin is from 0.02 to 0.12 moles of metal present as a metal oxo ion per kg of resin solids.

12. A dispersion according to claim 11 wherein the ratio of metal to resin is from 0.03 to 0.06 moles of metal present as a metal oxo ion per kg of resin solids.

13. A dispersion according to claim 1 wherein the mole ratio of metal oxo ion to hetero ion in the complex is between 1:5 and 1:12.

14. A dispersion according to claim 1 wherein the solution further comprises at least one fluoride containing compound.

15. A dispersion according to claim 1 wherein the dispersion has a pH of below 2.5.

16. A dispersion according to claim 1 wherein the resin has a monomer composition comprising methyl methacrylate, butyl acrylate, hydroxy ethyl acrylate, methacrylic acid, glycerol propoxy triacrylate, and a non ionic surfactant.

17. A dispersion according to claim 1 wherein the resin has a monomer composition comprising methyl methacrylate, butyl acrylate, acrylic acid, and a non ionic surfactant.

18. A dispersion according to claim 1 wherein the resin has a monomer composition comprising methyl methacrylate, butyl acrylate, styrene, hydroxy ethyl acrylate, methacrylic acid, glycerol propoxy triacrylate and a non ionic surfactant.

19. A dispersion according to claim 1 wherein the resin has a monomer composition comprising methyl methacrylate, butyl acrylate, hydroxy ethyl acrylate, acrylic acid, glycerol propoxy triacrylate, and a non ionic surfactant.

* * * * *